United States Patent
Sung et al.

(10) Patent No.: US 9,284,630 B2
(45) Date of Patent: Mar. 15, 2016

(54) NEGATIVE ACTIVE MATERIAL INCLUDING SI ACTIVE METAL GRAINS AND CU—AL METAL MATRIX SURROUNDING SI ACTIVE METAL GRAINS AND RECHARGEABLE LITHIUM BATTERY INCLUDING NEGATIVE ACTIVE MATERIAL

(75) Inventors: Min-Seok Sung, Suwon-si (KR);
Joon-Sup Kim, Suwon-si (KR);
Sung-Soo Kim, Suwon-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 971 days.

(21) Appl. No.: 11/604,712

(22) Filed: Nov. 28, 2006

(65) Prior Publication Data

US 2007/0122702 A1 May 31, 2007

(30) Foreign Application Priority Data

Nov. 29, 2005 (KR) ........................ 10-2005-0114829

(51) Int. Cl.
*H01M 4/134* (2010.01)
*H01M 4/1395* (2010.01)
*H01M 4/131* (2010.01)
*H01M 4/136* (2010.01)
*H01M 4/1391* (2010.01)
*H01M 4/1397* (2010.01)
*H01M 10/0525* (2010.01)
*C22C 28/00* (2006.01)
*C22C 9/10* (2006.01)
(Continued)

(52) U.S. Cl.
CPC . *C22C 28/00* (2013.01); *C22C 9/10* (2013.01); *H01M 4/134* (2013.01); *H01M 4/362* (2013.01); *H01M 4/46* (2013.01); *H01M 4/02* (2013.01); *H01M 4/463* (2013.01); *H01M 4/505* (2013.01); *H01M 4/525* (2013.01); *H01M 10/052* (2013.01); *H01M 10/0587* (2013.01); *H01M 2004/021* (2013.01); *Y02E 60/122* (2013.01)

(58) Field of Classification Search
CPC ........ H01M 4/134; H01M 4/362; H01M 4/46
USPC ......... 429/218.1, 220, 224, 229, 231.5, 231.6
See application file for complete search history.

(56) References Cited

U.S. PATENT DOCUMENTS

| 2003/0134198 A1 | 7/2003 | Sawa et al. |
| 2005/0031957 A1 | 2/2005 | Christensen et al. |

(Continued)

FOREIGN PATENT DOCUMENTS

| CN | 1639889 | 7/2005 |
| JP | 2000-311681 A | 11/2000 |

(Continued)

OTHER PUBLICATIONS

Iijima et al., Machine translation of JP 2005011650 A, Jan. 2005.*
Machine translation of JP 2001015102 A, Mifuji et al., Jan. 2001.*
Iijima et al., Human translation of JP 2005-011650 A, Jan. 2005.*

(Continued)

*Primary Examiner* — Sean P Cullen
(74) *Attorney, Agent, or Firm* — Robert E. Bushnell, Esq.

(57) ABSTRACT

A negative active material for a rechargeable lithium battery and a rechargeable lithium battery including the negative active material have a negative active material including either Si or Sn active metal grains and a metal matrix composed of at least two metal elements that surrounds the active metal grains but does not react therewith.

16 Claims, 21 Drawing Sheets

(51) Int. Cl.
    *H01M 4/36*     (2006.01)
    *H01M 4/46*     (2006.01)
    *H01M 4/02*     (2006.01)
    *H01M 4/505*     (2010.01)
    *H01M 4/525*     (2010.01)
    *H01M 10/052*     (2010.01)
    *H01M 10/0587*     (2010.01)

(56) References Cited

U.S. PATENT DOCUMENTS

2006/0040182 A1*   2/2006   Kawakami et al. ........ 429/218.1
2006/0147802 A1*   7/2006   Yasuda et al. ................ 429/233

FOREIGN PATENT DOCUMENTS

| | | |
|---|---|---|
| JP | 2001-015102 A | 1/2001 |
| JP | 2004-006206 A | 1/2004 |
| JP | 2005-011650 | 1/2005 |
| JP | 2005-116390 A | 4/2005 |
| JP | 2005-203343 A | 7/2005 |
| KR | 10-2001-0031868 A | 4/2001 |
| WO | 00/17949 A1 | 3/2000 |

OTHER PUBLICATIONS

Mifuji et al., Human translation of JP 2001-015102 A, Jan. 2001.*
"The extended European Search Report" issued on Feb. 5, 2009 in corresponding European patent application No. 06124957.9.
Transmitter letter and Korean Office Action issued by Korean Patent Office on Aug. 31, 2009 in the corresponding to Korean Patent Application No. 10-2005-0114829.
Japanese Office action dated Feb. 9, 2010, for corresponding Japanese Patent Application No. 2006-317645.
P. Villars, ASM Alloy Phase Diagram Database, WEB, Jun. 2015, ASM International, Materials Park, OH, 44073, USA.
European Office Action issued by European Patent Office on Jul. 30, 2013 in connection with European Patent Application No. 06 124 957.9-1359, which also claims Korean Patent Application No. 10-2005-0114829 as its priority document.
US Notice of Requirement for Restriction issued on Jul. 8, 2008 in connection with U.S. Appl. No. 11/028,661/ mailed on Jul. 8, 2008/ 13 pages.
European Office Action issued by European Patent Office on Dec. 22, 2015 in connection with European Patent Application No. 06 124 957.9-1359, which also claims Korean Patent Application No. 10-2005-0114829 as its priority document.

* cited by examiner

NEGATIVE ACTIVE MATERIAL INCLUDING SI ACTIVE METAL GRAINS AND CU—AL METAL MATRIX SURROUNDING SI ACTIVE METAL GRAINS AND RECHARGEABLE LITHIUM BATTERY INCLUDING NEGATIVE ACTIVE MATERIAL

CLAIM OF PRIORITY

This application makes reference to, incorporates the same herein, and claims all benefits accruing under 35 U.S.C.§119 from an application for NEGATIVE ACTIVE MATERIAL FOR RECHARGEABLE LITHIUM BATTERY AND RECHARGEABLE LITHIUM BATTERY earlier filed in the Korean Intellectual Property Office on the 29 Nov. 2005 and there duly assigned Serial No. 10-2005-0114829.

BACKGROUND OF THE INVENTION

1. Field of the Invention

The present invention relates to a negative active material for a rechargeable lithium battery and a rechargeable lithium battery including the negative active material. More particularly, the present invention relates to a negative active material having a high capacity and excellent cycle-life characteristics for a rechargeable lithium battery and a rechargeable lithium battery including the negative active material.

2. Description of the Related Art

Rechargeable lithium batteries use materials capable of reversibly intercalating or deintercalating lithium ions in positive and negative electrodes, and include an organic electrolyte solution or a polymer electrolyte between the positive and negative electrodes. Rechargeable lithium batteries generate electrical energy by an oxidation/reduction reaction during the intercalation/deintercalation of lithium ions at the positive and negative electrodes.

For a positive active material, composite metal oxides, such as $LiCoO_2$, $LiMn_2O_4$, $LiNiO_2$, $LiNi_{1-x}Co_xO_2$ ($0<x<1$), $LiMnO_2$, and so on, have been researched.

Conventionally, lithium metals have been used as a negative active material for the rechargeable lithium battery. However, an explosion can be caused by a short circuit of the battery due to formation of dendrites when using the lithium metal. Therefore, carbonaceous materials, such as amorphous carbon, crystalline carbon, etc., have recently been used as the negative active material in place of lithium metals. However, such carbonaceous material imparts a non-reversible capacity of 5 to 30% during the first several cycles, which wastes lithium ions and prevents at least one active material from being fully charged and discharged. Therefore, it has a reduced energy density.

In addition, it has recently become known that a metal negative active material, such as Si, Sn, and so on, which is supposed to have a high capacity, has a problem in that it imparts non-reversible capacity characteristics. Furthermore, a tin oxide disclosed by Japan Fuji Film. Co., Ltd. has come into the spotlight as an alternative to the carbonaceous negative active material. However, since the metal negative active material is included at 30% or less, the initial Coulomb efficiency is decreased. Furthermore, since lithium is continuously intercalated and deintercalated to generate a lithium-metal alloy, the capacity is significantly decreased and the capacity preserving rate is substantially deteriorated after repeating 150 charge and discharge cycles so that it is not commercially viable. Accordingly, considerable research has been recently undertaken to improve these characteristics.

SUMMARY OF THE INVENTION

One embodiment of the present invention provides a negative active material for a rechargeable lithium battery having a high capacity and excellent cycle-life characteristics.

Another embodiment of the present invention provides a rechargeable lithium battery including the negative active material.

According to one embodiment of the present invention, a negative active material for a rechargeable lithium battery includes:

Si and/or Sn active metal grains; and a metal matrix including at least two metal elements that do not react with the active metal grains, the metal matrix being configured to surround the active metal grains.

The metal matrix preferably includes Cu and Al. The metal matrix preferably further includes at least one element selected from a group consisting of Zn, Mg, Mn, Cr, Ti, and Ge.

The active metal grains and the metal matrix preferably include an alloy. The alloy is preferably expressed by the following Formula 1:

$$xA\text{-}yB\text{-}zC \qquad (1)$$

wherein: A and B are the same or individually Si or Sn; x ranges from 0 to 70 wt %; y ranges from 0 to 70 wt %; x+y ranges from 30 to 80 wt %; z ranges from 20 to 70 wt %; and C is Cu-aAl-bM, wherein M is a metal that can form an alloy, a ranges from 0 to 50 wt %, and b ranges from 0 to 20 wt %.

The negative active material preferably includes the metal matrix in an amount ranging from 20 to 70 wt % and the active metal grains in an amount ranging from 80 to 30 wt %. The negative active material more preferably includes the metal matrix in an amount ranging from 30 to 70 wt % and the active metal grains in an amount ranging from 70 to 30 wt %.

The active metal grains preferably have an average grain size ranging from 50 nm to 1000 nm. The active metal grains more preferably have an average grain size ranging from 50 nm to 500 nm.

According to another embodiment of the present invention, a rechargeable lithium battery includes: a negative electrode including a negative active material, the negative active material including Si and/or Sn active metal grains and a metal matrix including at least two metal elements that do not react with the active metal grains, the metal matrix being configured to surround the active metal grains; a positive electrode including a positive active material that reversibly intercalates and deintercalates lithium ions; and an electrolyte solution.

The metal matrix preferably includes Cu and Al. The metal matrix preferably further includes at least one element selected from a group consisting of Zn, Mg, Mn, Cr, Ti, and Ge.

The active metal grains and the metal matrix preferably include an alloy. The alloy is preferably expressed by the following Formula 1:

$$xA\text{-}yB\text{-}zC \qquad (1)$$

wherein: A and B are the same or individually Si or Sn; x ranges from 0 to 70 wt %; y ranges from 0 to 70 wt %; x+y ranges from 30 to 80 wt %; z ranges from 20 to 70 wt %; and C is Cu-aAl-bM, wherein M is a metal that can form an alloy, a ranges from 0 to 50 wt %, and b ranges from 0 to 20 wt %.

The negative active material preferably includes the metal matrix amount ranging from 80 to 30 wt %. The negative active material more preferably includes the metal matrix in an amount ranging from 30 to 70 wt % and the active metal grains in an amount ranging from 70 to 30 wt %.

The active metal grains preferably have an average grain size ranging from 50 nm to 1000 nm. The active metal grains more preferably have an average grain size ranging from 50 nm to 500 nm.

The positive active material preferably includes a lithiated intercalation compound including at least one compound selected from a group consisting of compounds represented by the following Formulae (2) to (15):

$$LiAO_2 \quad (2)$$

$$LiMn_2O_4 \quad (3)$$

$$Li_aNi_bB_cM_dO_2 \quad (4)$$

$$(0.95 \leq a \leq 1.1, 0 \leq b \leq 0.9, 0 \leq c \leq 0.5, 0.001 \leq d \leq 0.1)$$

$$Li_aNi_bCo_cMn_dM_eO_2 \quad (5)$$

$$(0.95 \leq a \leq 1.1, 0 \leq b \leq 0.9, 0 \leq c \leq 0.5, 0 \leq d \leq 0.5, 0.001 \leq e \leq 0.1)$$

$$Li_aAM_bO_2 \quad (6)$$

$$(0.95 \leq a \leq 1.1, 0.001 \leq b \leq 0.1)$$

$$Li_aMn_2M_bO_4 \quad (7)$$

$$(0.95 \leq a \leq 1.1, 0.001 \leq b \leq 0.1)$$

$$DX_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{3-x}F_2(PO_4)_3 \quad (14)$$

$$(0 \leq x \leq 3)$$

$$Li_{3-x}Fe_2(PO_4)_3 \quad (15)$$

$$(0 \leq x \leq 2);$$

wherein, in the Formulae (2) to (15):
A is selected from a group consisting of Co, Ni, and Mn;
B is either Co or Mn;
D is selected from a group consisting of Ti, Mo, and Mn;
E is selected from a group consisting of Cr, V, Fe, Sc, and Y;
F is selected from a group consisting of V, Cr, M, Co, Ni, and Cu;
M is at least one metal selected from a group consisting of Al, Cr, Mn, Fe, Mg, La, Ce, Sr, and V; and
X is either O or S.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention are described in detail below with reference to the accompanying drawings.

Embodiments of the present invention provide a negative active material for a rechargeable lithium battery using Si and/or Sn, which is being researched as a high-capacity negative active material.

Since both Si and Sn provide a battery with a high capacity, they are in the spotlight as negative active materials for rechargeable lithium batteries that require a higher capacity day by day. However, since their volume is expanded drastically while a battery including Si or Sn as a negative active material is charged and discharged, the use of Si or Sn deteriorates the cycle life of the battery. This is the obstacle that keeps Si and Sn from being commercially used as the negative active material in a battery.

Embodiments of the present invention provide a negative active material having a structure that can resolve the volume expansion problem.

The negative active material of embodiments of the present invention includes Si or Sn active metal grains and a metal matrix composed of more than two metal elements that surrounds the Si or Sn active metal grains but does not react therewith. Describing the structure of the negative active material in more detail, a grain of powder includes a plurality of Si or Sn grains, and the grains are firmly connected to each other by a very tough metal alloy. A metal matrix surrounds the Si or Sn grains.

Figure 2:
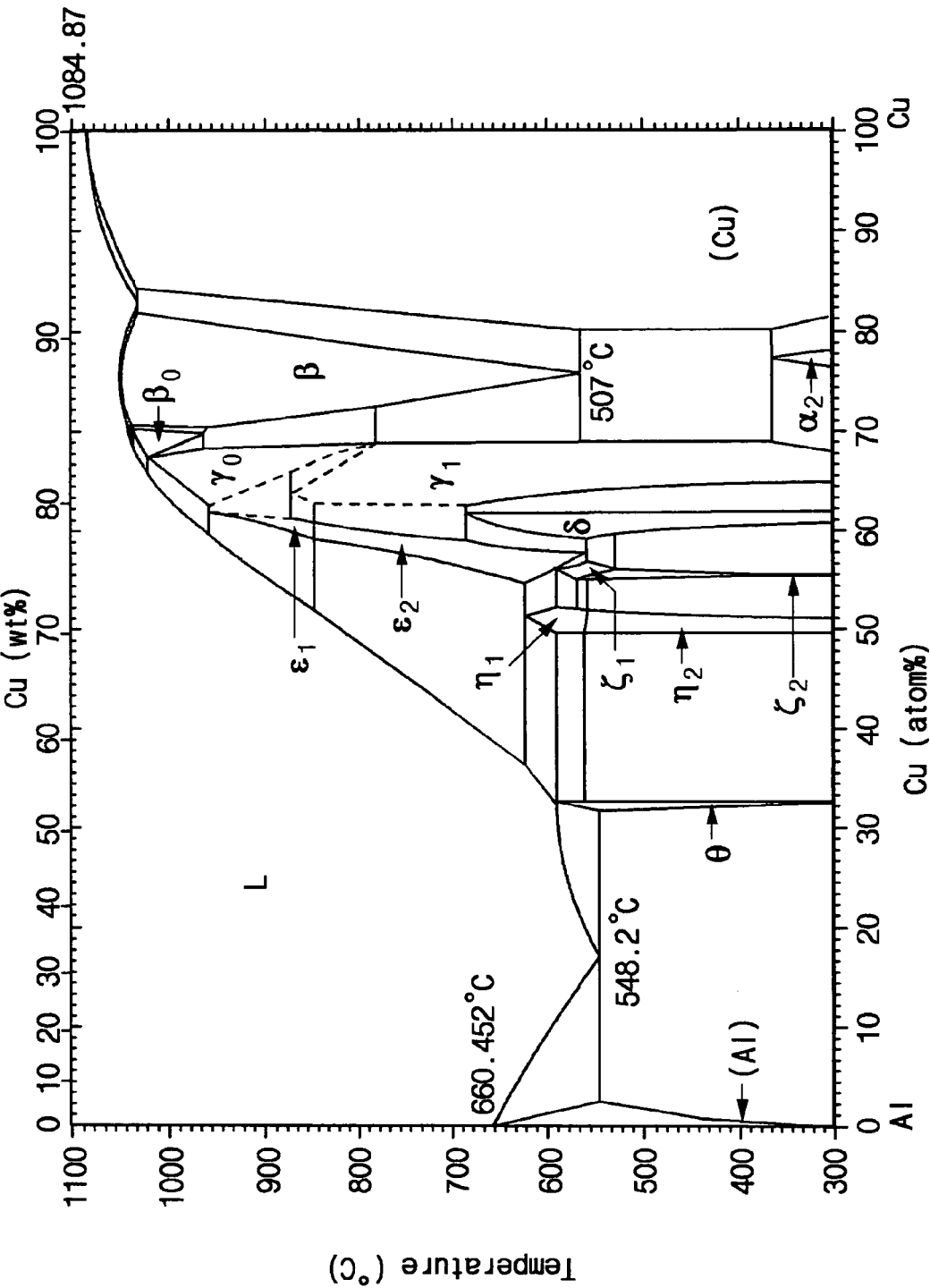
FIG. 2 is a graph of a Cu—Al binary phase of the present invention.

The metal matrix may be formed of a binary metal alloy that includes Cu and Al. When the metal matrix is formed of only Cu, the Cu reacts with the Si to produce a brittle $Cu_3Si$ compound, which is not an appropriate result for resolving the volume expansion problem of Si. When both Cu and Al are used, the Cu reacts with the Al to prevent the Cu from reacting with the Si, as shown in FIG. 2. Also, it is possible to form a metal alloy matrix including three to five metal elements including at least one element selected from a group consisting of Zn, Mg, Mn, Cr, Ti, Ge, and a combination thereof, in addition to Cu and Al.

In the negative active material of the present embodiment having the above structure, the metal matrix and the Si or Sn exist in the form of an alloy. They are expressed by the following Chemical Formula 1:

$$xA\text{-}yB\text{-}zC \quad (1)$$

In the above Formula 1: A and B may be the same or individually Si or Sn; x ranges from 0 to 70 wt %; y ranges from 0 to 70 wt %; x+y ranges from 30 to 80 wt %; z ranges from 20 to 70 wt %; and C is Cu-aAl-bM, wherein M is a metal that can be alloyed and a is between 0 to 50 wt % while b is between 0 to 20 wt %. Non-limiting examples of M include Zn, Mg, Mn, Cr, Ti, and Ge.

The x, y, and z are weight percent (wt %) of each component in the alloy, and z is the content of the C component. As described above, since C includes Cu and Al and optionally M, C occupies 20 to 70 wt % of the entire alloy. Also, since a is the content of Al in the entire alloy, and b is the content of M in the entire alloy, the content of Cu can be obtained by subtracting the contents of Al and M from 20 to 70 wt %.

In the negative active material of the present embodiment, the content of the metal matrix may range from 20 to 70 wt %, more specifically, from 30 to 70 wt %. Also, the content of Si or Sn grains may range from 30 to 80 wt %, more specifically from 30 to 70 wt %. When the content of the metal matrix is lower than 20 wt %, the metal matrix may not be formed in band form where the metal matrix surrounds the Si or Sn grains. When it is more than 70 wt %, the capacity is deteriorated.

When a binary metal alloy including Cu and Al is used as the metal matrix, the content of Cu in the metal alloy matrix may range from 70 to 95 wt %, more specifically, from 84 to 91 wt %. When the metal matrix is formed of a metal alloy including 3 to 5 metal elements, i.e., Cu, Al, and at least one expressed as M in the Chemical Formula 1, the content of Cu may be the same. When the mixing ratio of the metal elements in the metal alloy matrix is out of the above ranges, β phases of Cu—Al are not formed so that Si reacts with Cu, which is undesirable.

The size of the Si or Sn grains ranges from 50 to 1000 nm, more specifically, from 50 to 500 nm. When the size of the grains is larger than 1000 nm, the metal matrix becomes so thin that volume expansion causes considerable deformation, which is undesirable. It is almost impossible to form the grains smaller than 50 nm.

The negative active material having the above-described structure is prepared by mixing Si or Sn with a metal that does not react with Si and Sn, melting the metals in an ark dissolving method at a temperature equal to or greater than 1500° C., and solidifying the molten solution in a rapid ribbon solidification method in which a molten solution is sprayed onto a rotating kappa roll. The quenching speed is the rotation rate of the kappa roll, which is between 2000 and 4000 rpm in the present embodiment. Any other solidification method may be used rather than the rapid ribbon solidification as long as sufficient quenching speed is reached.

The rechargeable lithium battery including the negative active material according to the present embodiment includes a negative electrode, a positive electrode, and an electrolyte. The positive electrode may include an active material capable of carrying out the electrochemical oxidation and reduction reaction, and may include a lithiated intercalation compound generally used in the rechargeable lithium battery field. Examples of the lithiated intercalation compound include at least one compound selected from a group consisting of compounds represented by the following Formulae (2) to (15).

$$LiAO_2 \quad (2)$$

$$LiMn_2O_4 \quad (3)$$

$$Li_aNi_bB_cM_dO_2 \quad (4)$$

$$(0.95 \leq a \leq 1.1, 0 \leq b \leq 0.9, 0 \leq c \leq 0.5, 0.001 \leq d \leq 0.1)$$

$$Li_aNi_bCo_cMn_dM_eO_2 \quad (5)$$

$$(0.95 \leq a \leq 1.1, 0 \leq b \leq 0.9, 0 \leq c \leq 0.5, 0 \leq d \leq 0.5, 0.001 \leq e \leq 0.1)$$

$$Li_aAM_bO_2 \quad (6)$$

$$(0.95 \leq a \leq 1.1, 0.001 \leq b \leq 0.1)$$

$$Li_aMn_2M_bO_4 \quad (7)$$

$$(0.95 \leq a \leq 1.1, 0.001 \leq b \leq 0.1)$$

$$DX_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{3-x}F_2(PO_4)_3 \quad (14)$$

$$(0 \leq x \leq 3)$$

$$Li_{3-x}Fe_2(PO_4)_3 \quad (15)$$

$$(0 \leq x \leq 2)$$

In the above Formulae (2) to (15):

A is selected from a group consisting of Co, Ni, and Mn;

B is either Co or Mn;

D is selected from a group consisting of Ti, Mo, and Mn;

E is selected from a group consisting of Cr, V, Fe, Sc, and Y;

F is selected from a group consisting of V, Cr, M, Co, Ni, and Cu;

M is at least one metal selected from a group consisting of Al, Cr, Mn, Fe, Mg, La, Ce, Sr, and V; and X is either O or S.

The electrolyte solution includes a non-aqueous organic solvent and a lithium salt.

The lithium salt is dissolved in the non-aqueous organic solvent to supply lithium ions in the battery. It can perform a basic operation of a rechargeable lithium battery and facilitates transmission of the lithium ions between the positive and negative electrodes. Non-limiting examples of the lithium salt include at least one supporting electrolyte salt selected from a group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2, C_yF_{2y+1}SO_2$, (where, x and y are natural numbers), LiCl, and LiI. The concentration of the lithium salt preferably ranges from 0.1 to 2.0 M. When the concentration of the lithium salt is less than 0.1 M, the electrolyte performance is deteriorated due to its low ionic conductivity. When the concentration of the lithium salt is greater than 2.0 M, the lithium ion mobility is decreased due to an increase of the electrolyte viscosity.

The non-aqueous organic solvent acts as a medium for transmitting ions taking part in the electrochemical reaction of the battery. The non-aqueous organic solvent may include, but is not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein, R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propinonate, ethyl propinonate, methyl acetate, ethyl acetate, propyl acetate, dimethoxyethane, 1,3-dioxolan, diglyme, tetraglyme, ethylene carbonate, propylene carbonate, γ-butyrolactone, sulfolane, valerolactone, decanolide, and mevalolactone. The non-aqueous organic solvent may be used singularly or in a mixture. When the organic solvent is used in a mixture, a mixing ratio can be controlled in accordance with a desirable battery performance.

Figure 1:
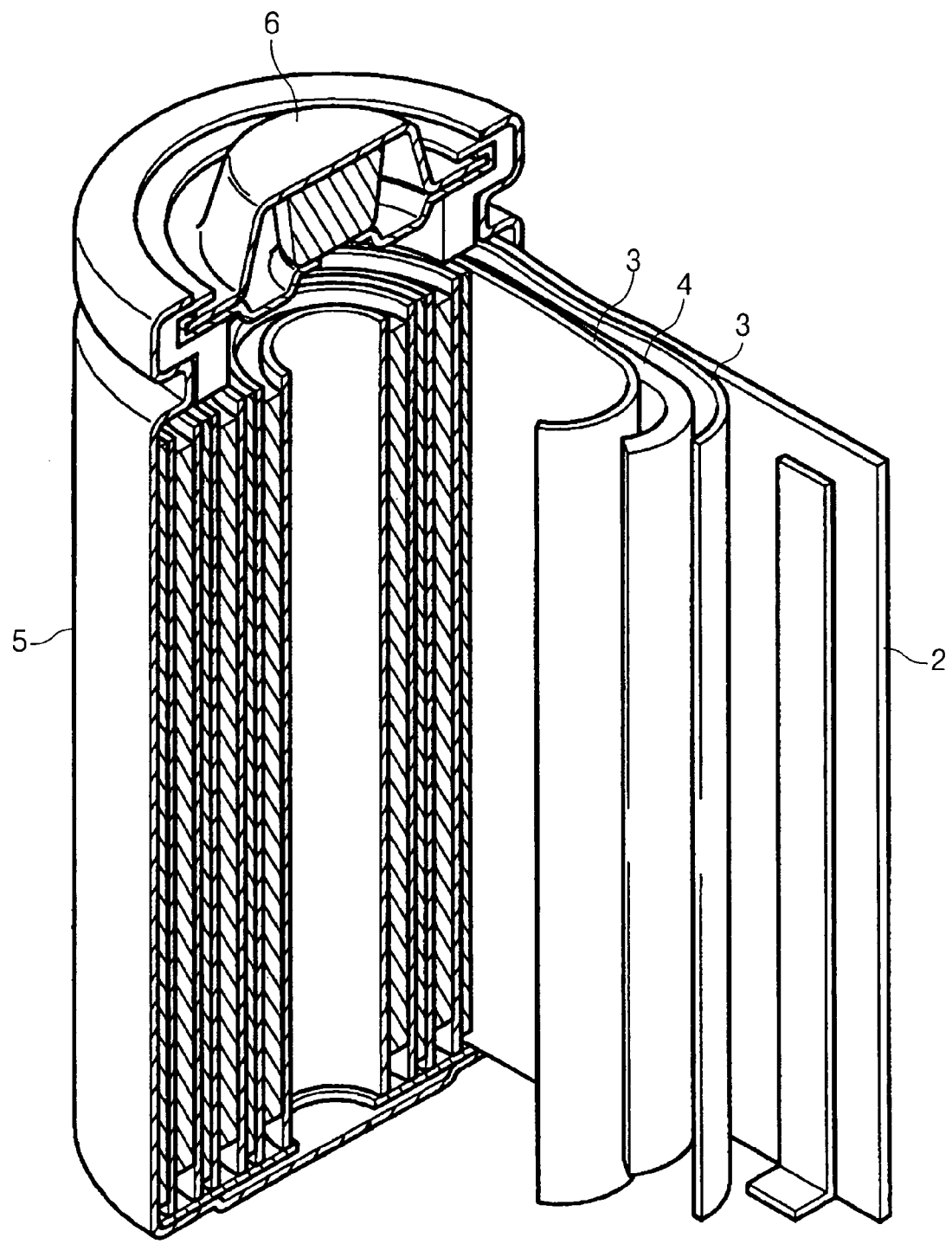
FIG. 1 is a perspective view of a rechargeable lithium battery according to an embodiment of the present invention.

FIG. 1 is a view of a rechargeable lithium battery having the above-mentioned structure according to an embodiment of the present invention. FIG. 1 illustrates a cylindrical lithium ion cell 1 which includes a negative electrode 2, a positive electrode 4, a separator 3 interposed between the negative electrode 2 and the positive electrode 4, an electrolyte impregnating the separator 3, a battery case 5, and a sealing member 6 sealing the battery case 5. Needless to say, the rechargeable lithium battery according to the present embodiment is not limited to the above-mentioned shape, and may be shaped into a prismatic shape, a pouch, and so on.

The following examples illustrate the present embodiment in detail. However, it is understood that the present invention is not limited by these examples.

Example 1

A negative active material for a rechargeable lithium battery including Si in a Cu—Al metal matrix was prepared by mixing Si, Cu, and Al in a composition ratio of Si 60 wt %, Cu 35.08 wt %, and Al 4.92 wt %, melting them in an ark dissolving method at a temperature equal to or greater than 1500° C. to thereby prepare a SiCuAl alloy, and solidifying the SiCuAl alloy in a rapid ribbon solidification method. The quenching speed, i.e., the rotation rate of a kappa roll, was 2000 rpm. The above-prepared negative active material included Si 60 wt %, Cu 35.08 wt %, and Al 4.92 wt %.

Example 2

A negative active material was prepared by performing the same processes as in Example 1, except that the quenching speed was 4000 rpm.

Example 3

A negative active material was prepared by performing the same processes as in Example 1, except that the quenching speed was 3000 rpm.

Example 4

A negative active material was prepared by performing the same processes as in Example 1, except that the contents of Si, Cu, and Al were changed to 50 wt %, 44.15 wt %, and 5.85 wt %, respectively, and the quenching speed was 2000 rpm.

Example 5

A negative active material was prepared by performing the same processes as in Example 1, except that the contents of Si, Cu, and Al were changed to 40 wt %, 52.98 wt %, and 7.02 wt %, respectively, and the quenching speed was 2000 rpm.

Example 6

A negative active material was prepared by performing the same processes as in Example 1, except that the contents of Si, Cu, and Al were changed to 30 wt %, 61.81 wt %, and 8.19 wt %, respectively.

Example 7

A negative active material was prepared by performing the same processes as in Example 1, except that the contents of Si, Cu, and Al were changed to 50 wt %, 44.15 wt %, and 5.85 wt %, respectively, and the quenching speed was 3000 rpm.

Example 8

A negative active material was prepared by performing the same processes as in Example 1, except that the rotation rate was 4000 rpm.

Example 9

A negative active material was prepared by performing the same processes as in Example 3, except that the rotation rate was 4000 rpm.

Example 10

A negative active material was prepared by performing the same processes as in Example 4, except that the rotation rate was 4000 rpm.

Example 11

A negative active material was prepared by performing the same processes as in Example 6, except that the rotation rate was 4000 rpm.

Example 12

A negative active material was prepared by performing the same processes as in Example 6, except that the rotation rate was 2000 rpm.

Comparative Example 1

A negative active material was prepared by dissolving Si and Pb in an ark dissolving method. The content of Si was 70 wt %.

Comparative Example 2

A Si—Cu negative active material was prepared by dissolving Si and Cu in an ark dissolving method and solidifying the alloy solution in a rapid ribbon solidification method. The content of Si was 40 wt %.

Comparative Example 3

A negative active material was prepared by the same method as in Comparative Example 1, except that the content of Si was 60 wt %.

Figure 3:
FIG. 3 is an optical microscope photograph of a 200-fold magnification of a negative active material prepared according to Comparative Example 1.

SEM Photographs:

FIG. 3 shows the micro structure of the Si—Pb alloy prepared according to Comparative Example 1. FIG. 3 shows a structure where Pb surrounds a primary solid phase Si, which means an initially formed metal core.

Figure 4:
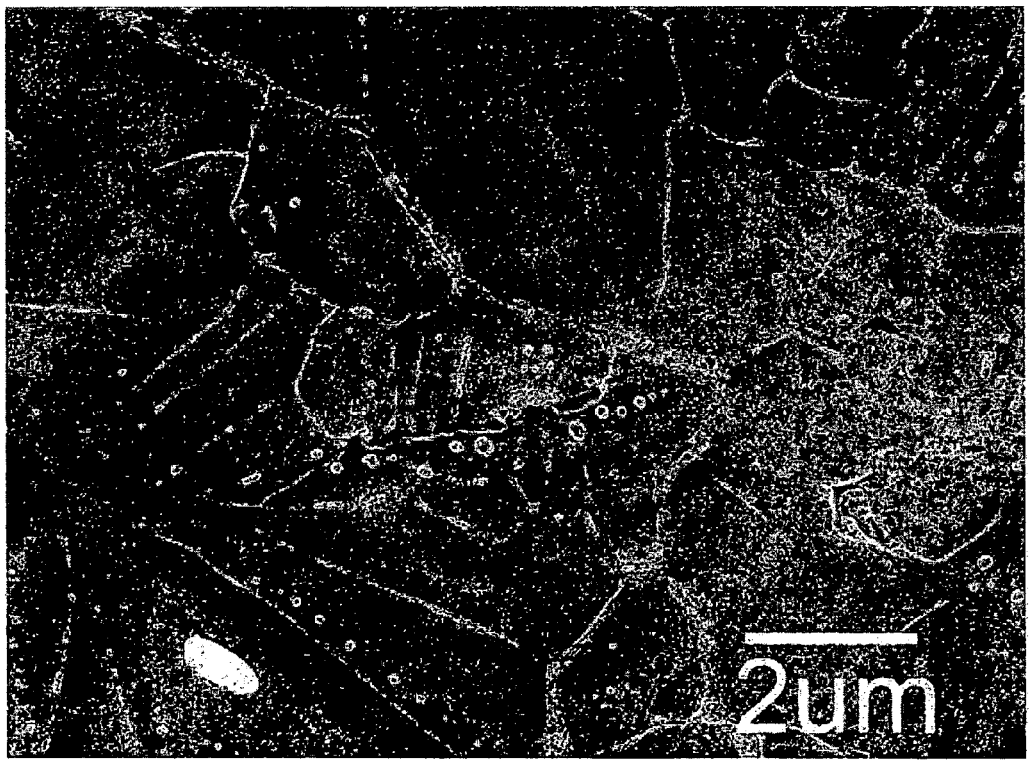
FIG. 4 is a Scanning Electron Microscope (SEM) photograph of a 10,000-fold magnification of a negative active material according to Comparative Example 2.

FIG. 4 shows a Scanning Electron Microscope (SEM) photograph showing a 10,000-fold magnification of the negative active material prepared according to Comparative Example 2. FIG. 4 shows a structure where a Cu-based alloy surrounds the primary solid phase Si, i.e., a grain boundary, or distribution of Si grains. However, the metal matrix is formed of Si—Cu-based intermetallics.

Figure 5:
FIG. 5 is a SEM photograph of 10,000-fold magnification of a negative active material according to Example 1 of the present invention.
Figure 6:
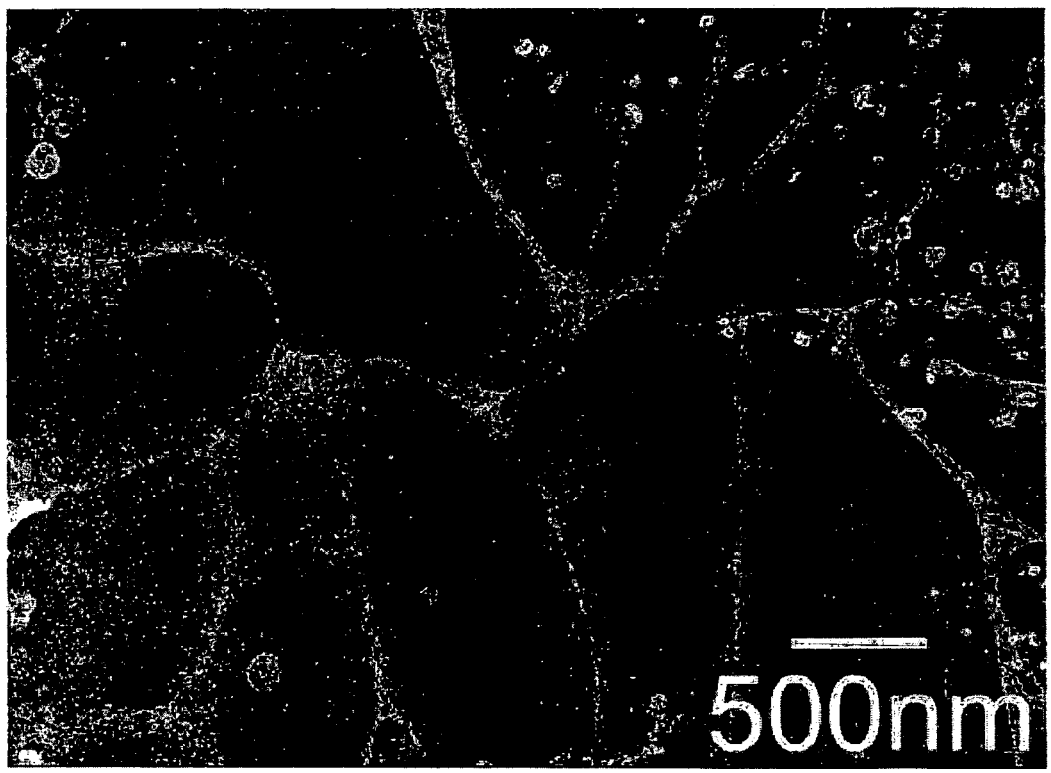
FIG. 6 is a SEM photograph of a 20,000-fold magnification of a negative active material prepared according to Example 1 of the present invention.

FIG. 5 shows a SEM photograph showing a 10,000-fold magnification of the negative active material prepared according to Example 1, and FIG. 6 shows a SEM photograph showing a 20,000-fold magnification of the negative active material.

When FIG. 4 is compared with FIG. 5, the micro structure of the Si—Cu negative active material (FIG. 4) of Comparative Example 2 and the micro structure of the Si—Cu—Al negative active material (FIG. 5) of Example 1 have little difference.

FIG. 3 to FIG. 6 also show little difference among the Si—Pb negative active material of Comparative Example 1, the Si—Cu negative active material of Comparative Example 2, and the Si—Cu—Al negative active material of Example 1. In short, although the structures of the negative active materials prepared according to Comparative Examples 1 to 2 and Example 1 are the same, the negative active material of Comparative Example 1 cannot be used for a rechargeable lithium battery, and the negative active material of Comparative Example 2 cannot be used for a rechargeable lithium battery, either, because Si—Cu intermetallics are formed.

Figure 7:
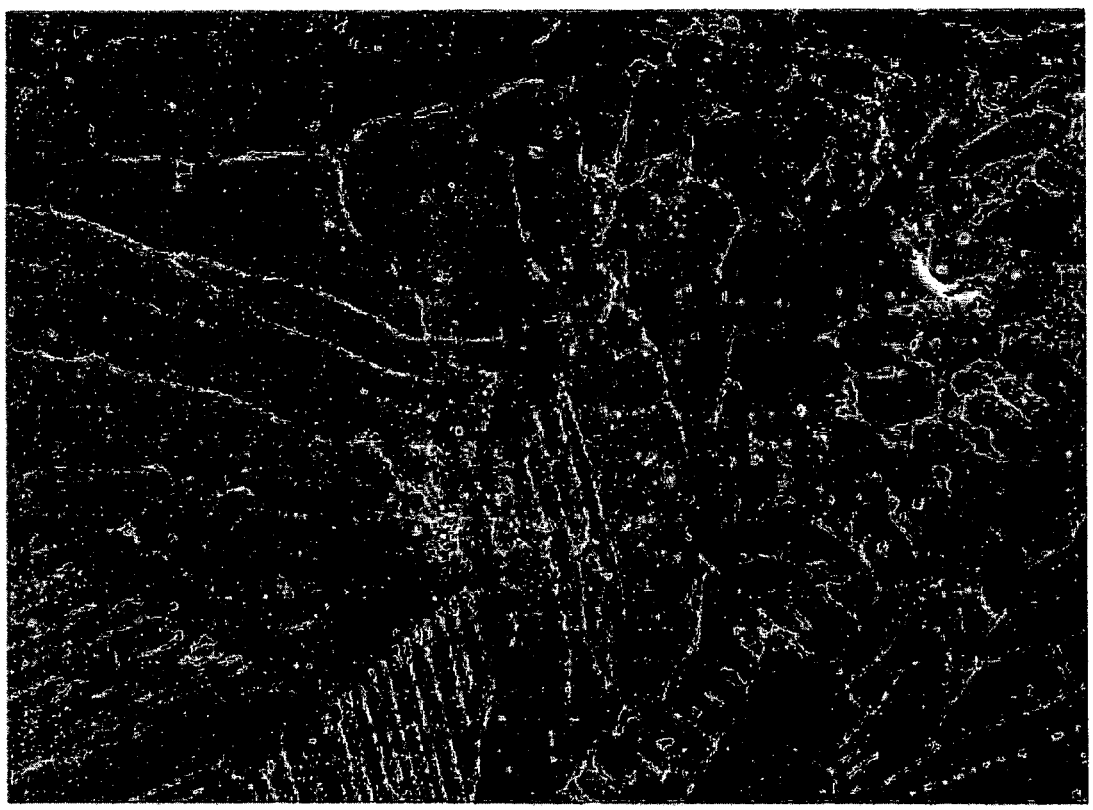
FIG. 7 is a SEM photograph of a 10,000-fold magnification of a negative active material prepared according to Example 2 of the present invention.
Figure 8:
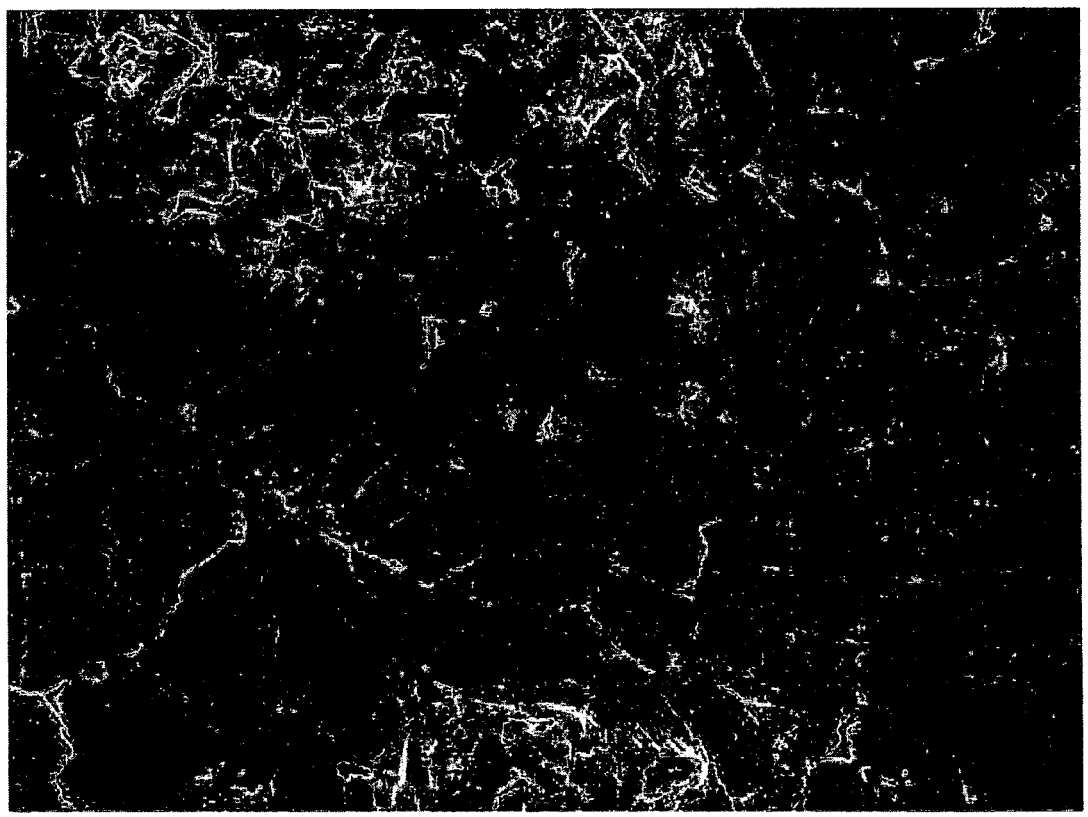
FIG. 8 is a SEM photograph of a 10,000-fold magnification of a negative active material prepared according to Example 3 of the present invention.

Change in Grains Based on Quenching Speed:

FIGS. 5, 7, and 8 are SEM photographs showing 10,000-fold magnifications of the negative active materials prepared according to Examples 1 to 3. As shown in FIGS. 5, 7, and 8, as the quenching speed is increased, the grain size of the negative active material becomes smaller and the Cu—Al alloy does not completely surround the Si grains and simply forms branches including the Si grains between them.

Figure 9:
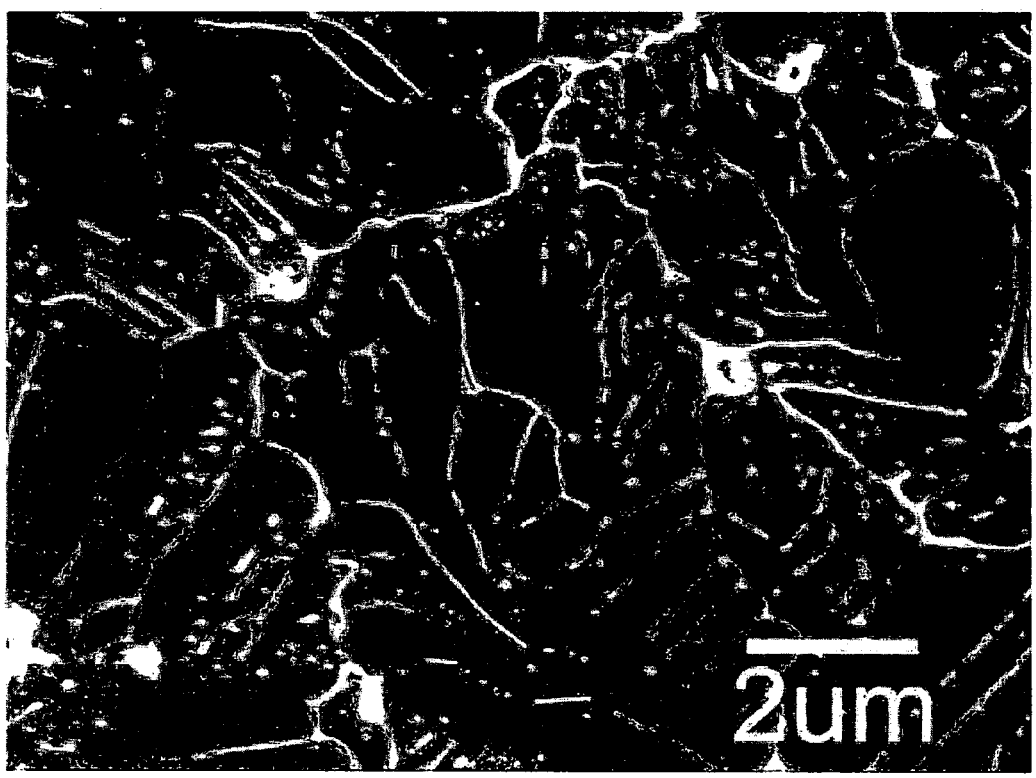
FIG. 9 is a SEM photograph of a 10,000-fold magnification of a negative active material prepared according to Example 4 of the present invention.
Figure 10:
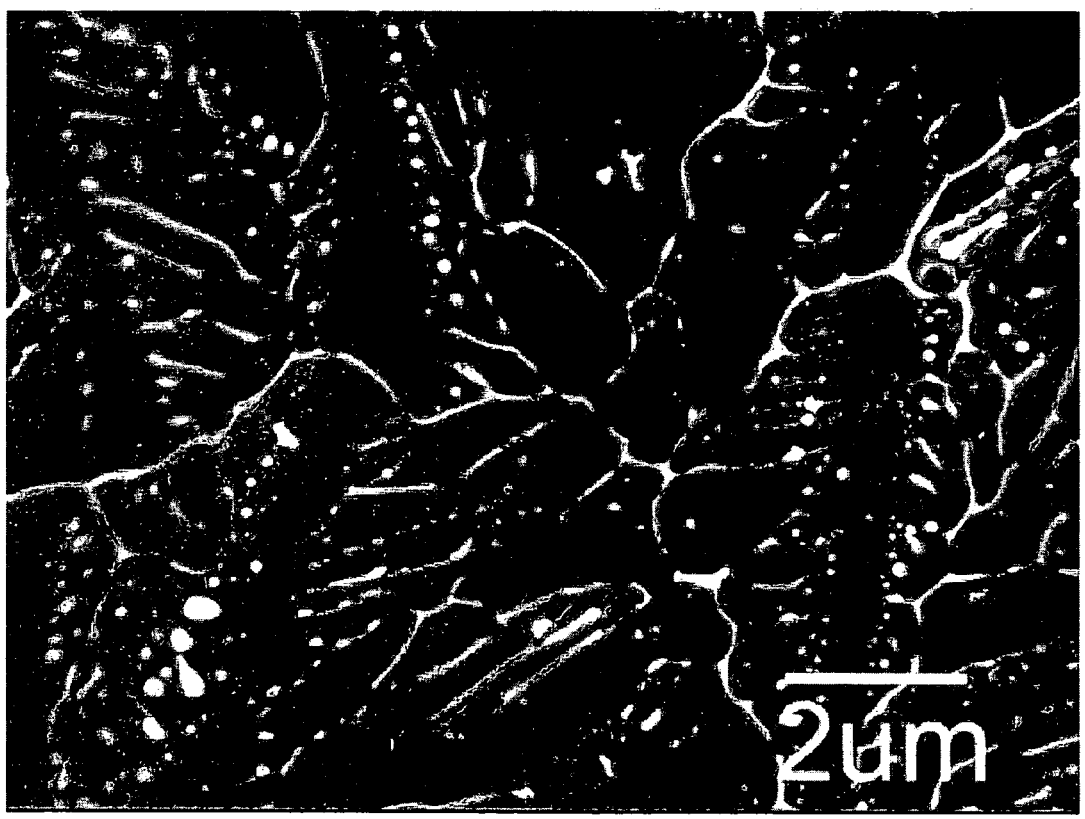
FIG. 10 is a SEM photograph of a 10,000-fold magnification of a negative active material prepared according to Example 5 of the present invention.
Figure 11:
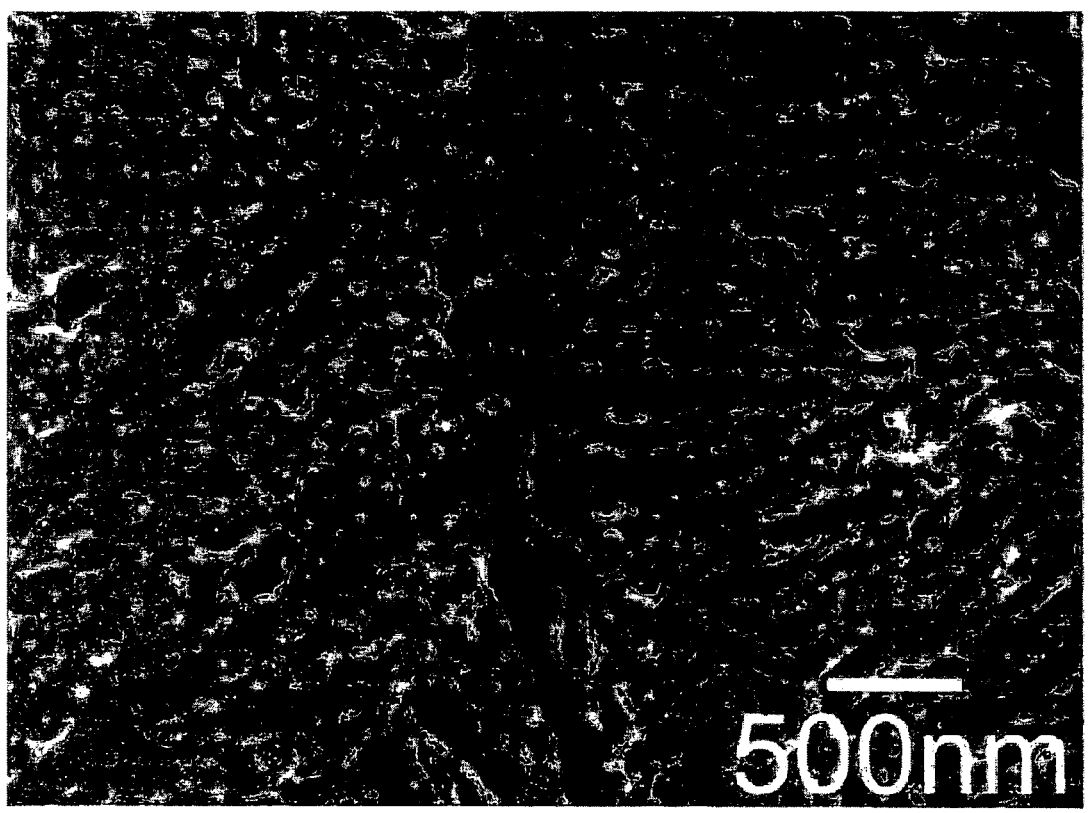
FIG. 11 is a SEM photograph of a 10,000-fold magnification of a negative active material prepared according to Example 6 of the present invention.

Change in Grains Based on Composition:

FIGS. 5, 9, and 11 are SEM photographs showing 10,000-fold magnifications of the negative active material prepared according to Examples 1, 4, 5, and 6. It can be seen from FIGS. 5, 9, and 11 that, as the content of Cu increases, the Si grains become finer and exist uniformly. This result can be explained by the heat conductivity of Cu. Since Cu has excellent heat conductivity compared to other metals, Cu easily loses heat during quenching and thus it has a higher quenching speed. Consequently, the Si grains become finer as the quenching speed is increased.

Referring to FIG. 11, the micro structure of the metal alloy prepared according to Example 6 shows a very fine Si grain size that ranges from 100 to 300 nm and the Cu—Al alloy band uniformly surrounding the Si grains. Thus, it can be seen that the metal alloy effectively alleviates the stress caused by the Si contraction and expansion.

Figure 12:
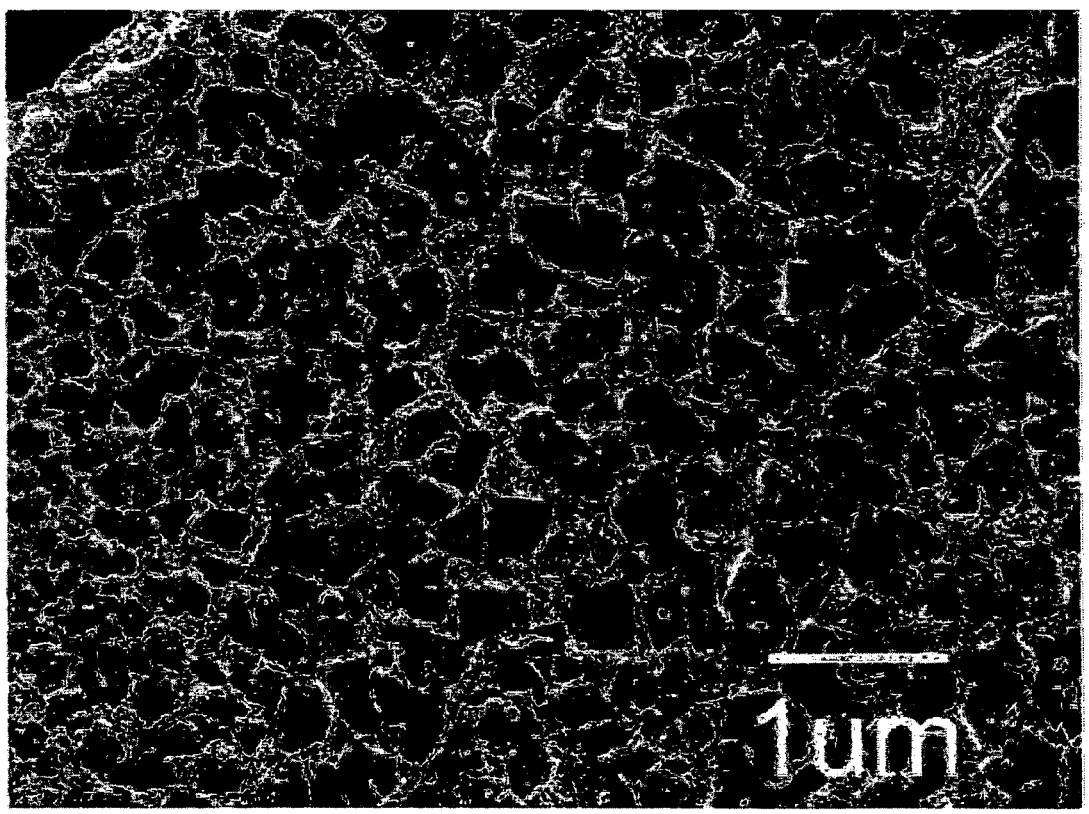
FIG. 12 is a SEM photograph of a 10,000-fold magnification of a negative active material prepared according to Example 7 of the present invention.
Figure 13A:
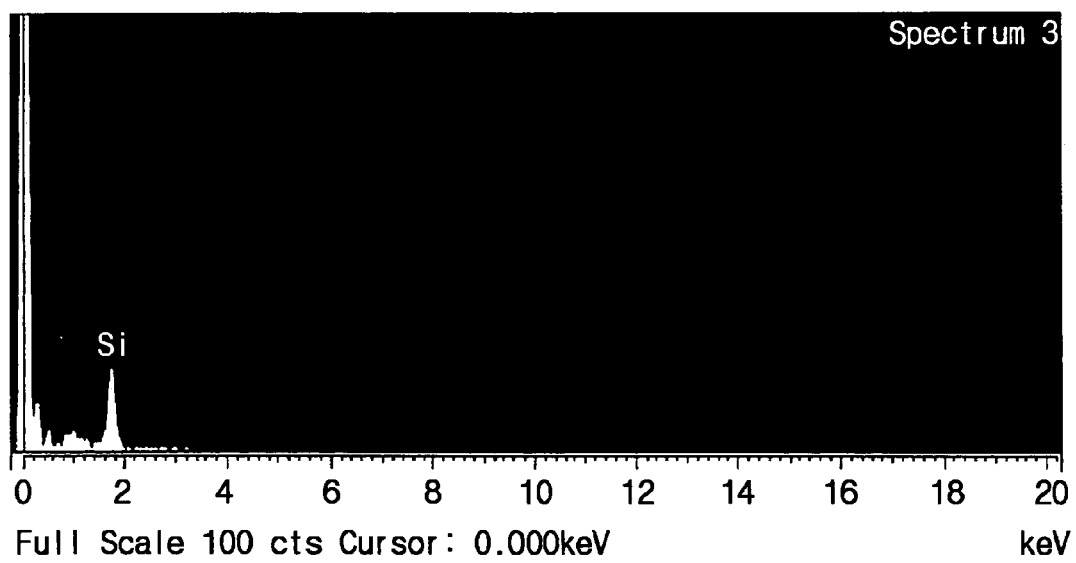
FIGS. 13A and 13B are graphs of XRD results of a negative active material prepared according to Example 7 of the present invention.
Figure 13B:
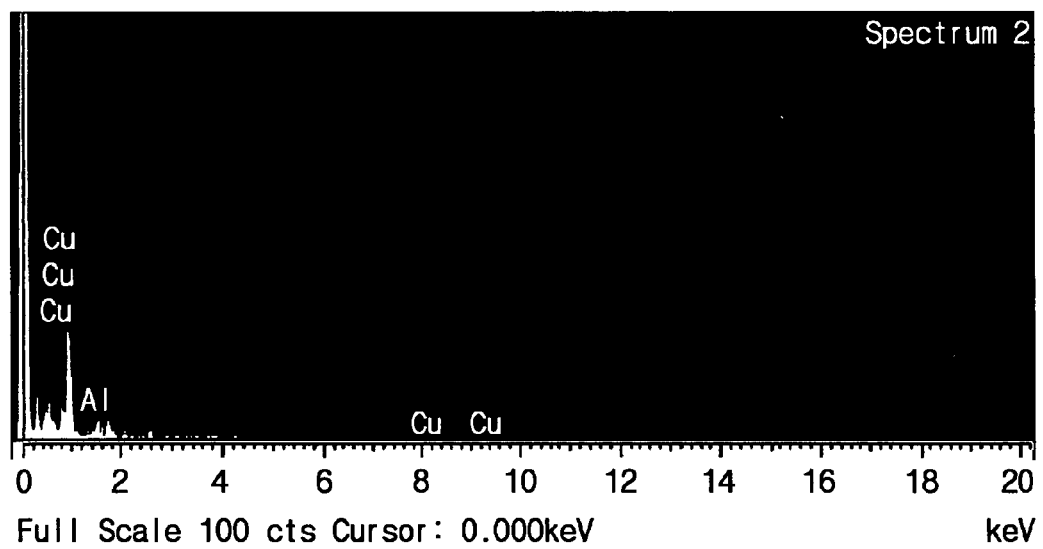

In addition, FIG. 12, which presents a SEM photograph showing a 10,000-fold magnification of the negative active material prepared according to Example 7, shows the uniform distribution of Si grains having a grain size of less than 500 nm. The XRD results of FIGS. 13A and 13B show that there is Cu and Al, in addition to the Si grains. It can be seen from the SEM photographs and XRD results that the Cu—Al alloy band uniformly surrounds the Si grains.

Figure 14:
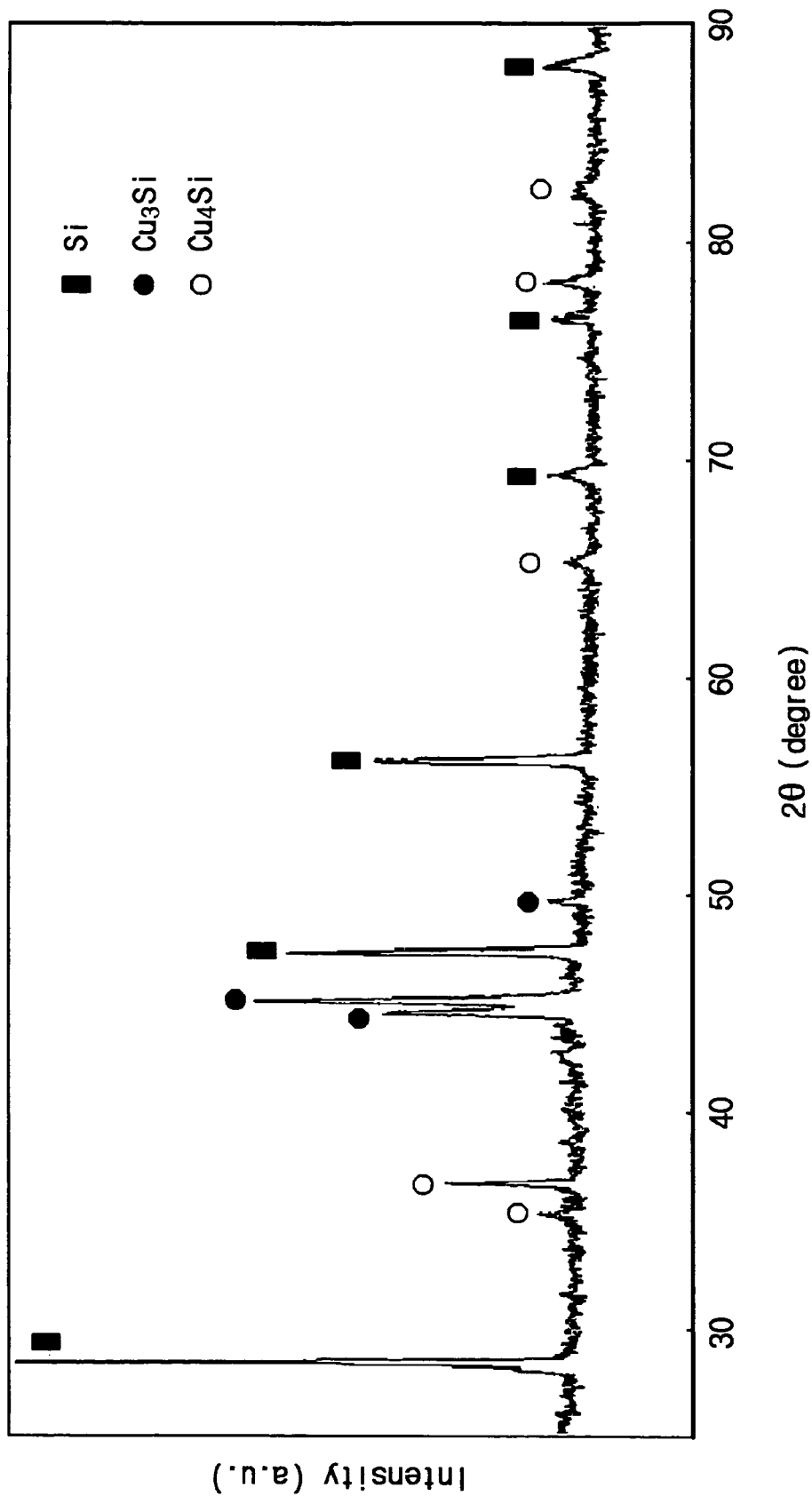
FIG. 14 is a graph of an XRD result of a negative active material prepared according to Comparative Example 2.

X_Ray Diffraction (XRD) Measurement:

XRD of the negative active material of Comparative Example 2 after the quenching process was measured and is presented in FIG. 14. It can be seen from FIG. 14 that most of the Cu in the Si—Cu binary alloy exists in the form of Cu3Si and Cu4Si before and after the quenching. In other words, it is impossible to suppress the formation of intermetallics through heat treatment or quenching. Since the intermetallics have high strength and high brittleness, it is impossible to effectively suppress the expansion of Si.

Figure 15A:
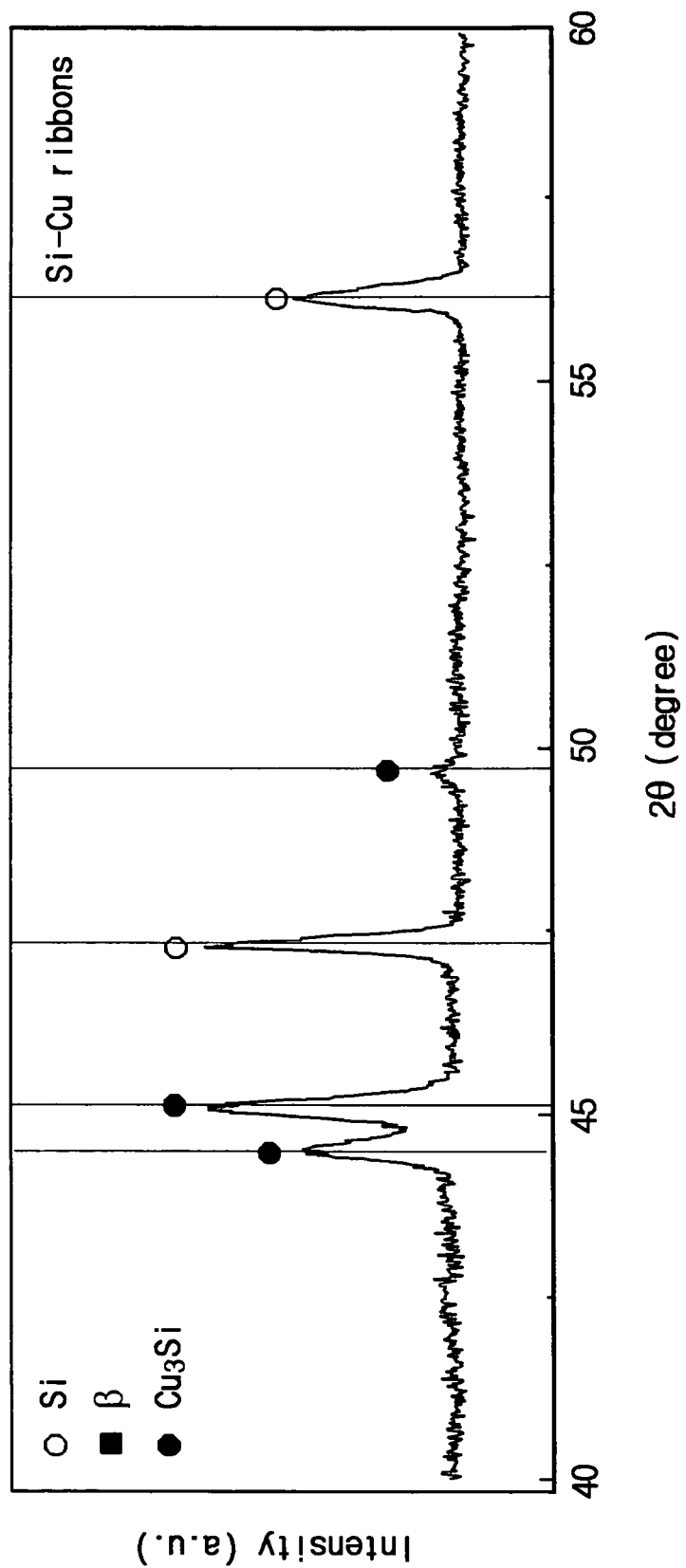
FIGS. 15A and 15B are graphs of XRD results of negative active materials prepared according to Comparative Example 2 and Example 1.
Figure 15B:
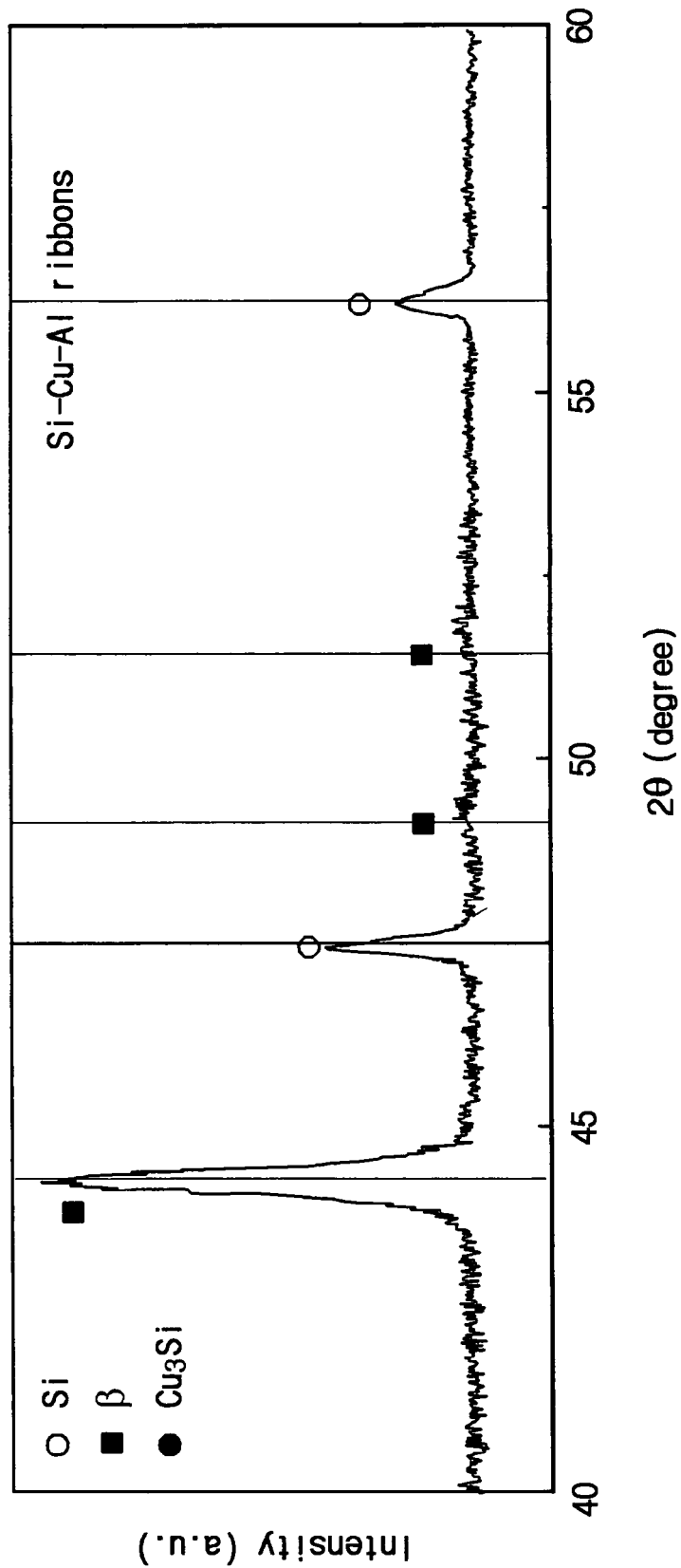

FIGS. 15A and 15B show XRD results of the negative active materials prepared according to Example 1 and Comparative Example 2. FIGS. 15A and 15B show that a Si peak appears in both the negative active materials of Example 1 and Comparative Example 2. Also, FIG. 15A shows that $Cu_3Si$ and $CU_4Si$ peaks appear in the negative active material of Comparative Example 2, and FIG. 15B shows that a new β-peak appears in the negative active material of Example 1 while the $Cu_3Si$ and $Cu_4Si$ peaks disappear. In short, it can be seen that the addition of Al suppresses the formation of Cu—Si-based intermetallics.

Figure 16:
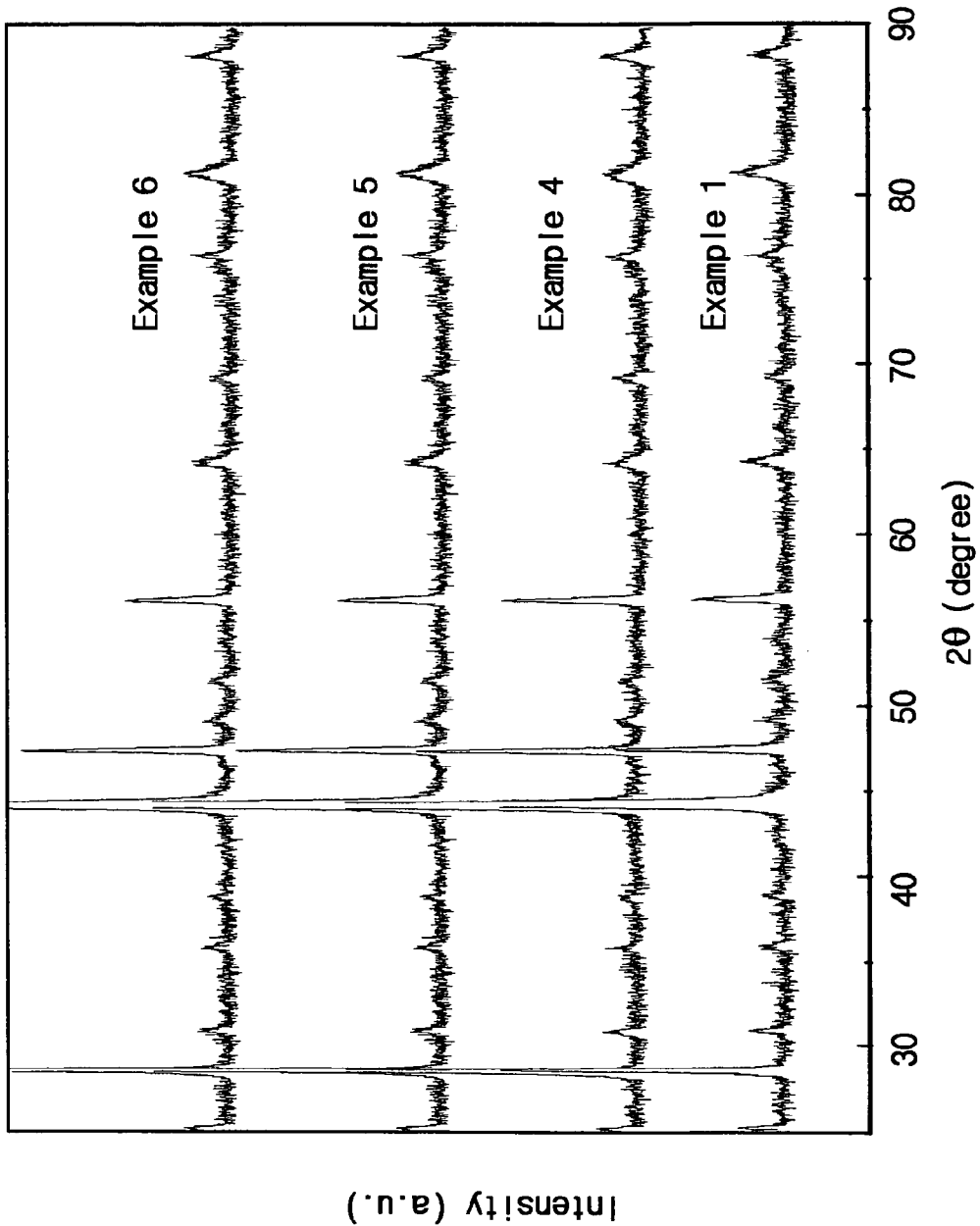
FIG. 16 is a graph of XRD results of the negative active materials prepared according to Examples 1 and 4 to 6.

XRDs of the negative active materials prepared according to Examples 1, 4, 5, and 6 were measured and are presented in FIG. 16. As shown in FIG. 16, although the composition of Si, Cu, and Al was changed, the same Si and β negative active material as that of Example 1 was prepared.

Figure 17:
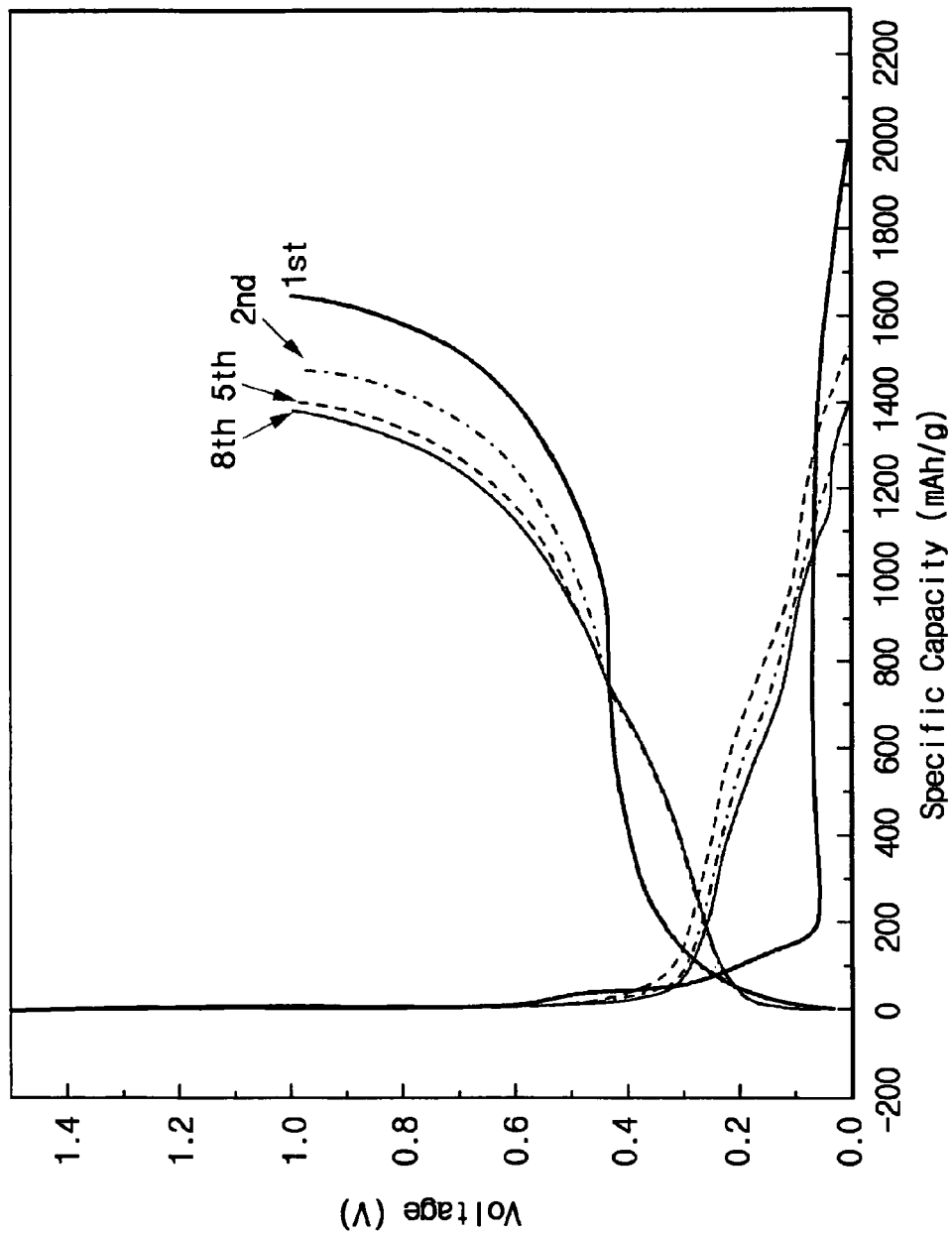
FIG. 17 is a graph of electrochemical characteristics of the negative active material prepared according to Example 7 of the present invention.

Capacity and Cycle-Life Characteristics Result:

A coin cell was prepared by using the rapid solidification ribbon prepared according to Example 7, and the characteristics of the coil cell were evaluated. The evaluation results are presented in FIG. 17. As shown in FIG. 17, the initial efficiency was more than 82% and the initial discharge capacity was 1600 mAh/g.

Figure 18A:
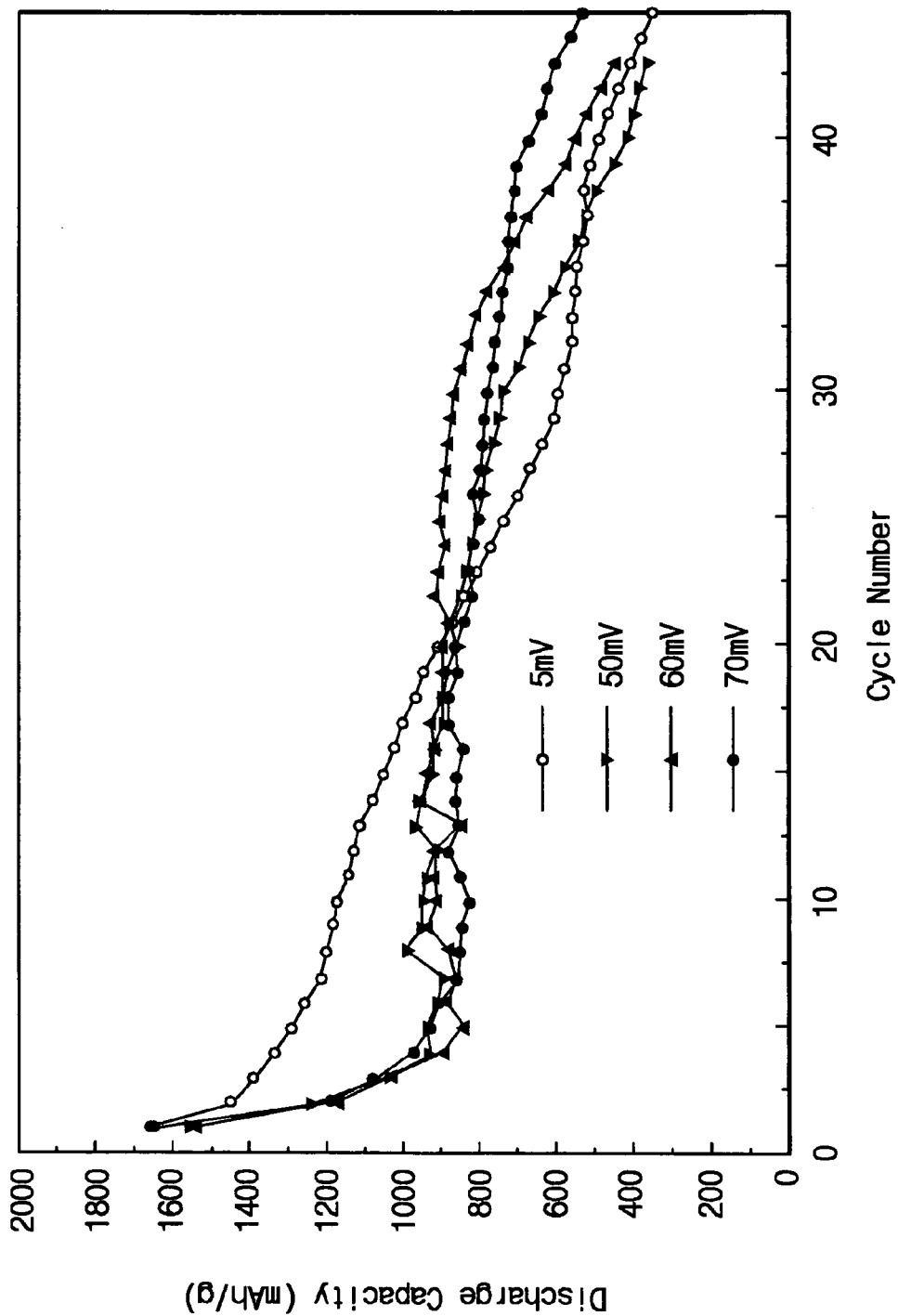
FIGS. 18A and 18B are graphs of cycle-life characteristics and Coulomb efficiency of a rechargeable lithium battery including the negative active material prepared according to Example 7 of the present invention.

Also, a rechargeable lithium battery was prepared by using the negative electrode of Example 7 in a conventional method. The rechargeable lithium battery was charged and discharged in 50 cycles at 0.4 C (2.1 mA), and the discharge capacity based on the cycles, i.e., the cycle-life characteristics, was measured. The measurement results are presented in FIG. 18.

Figure 18B:
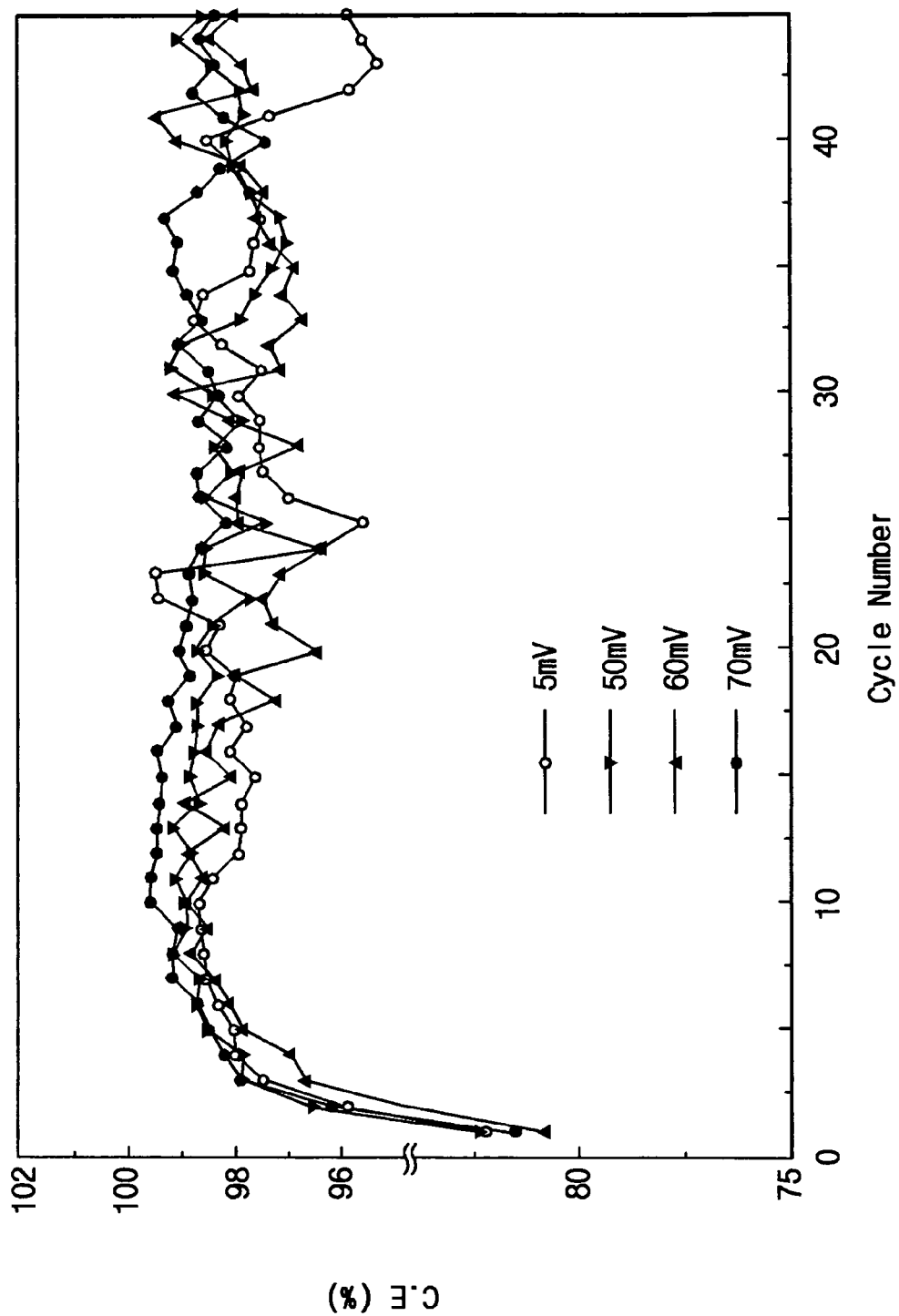

Also, Coulomb efficiency (C.E.) based on the cycles was measured and is presented in FIG. 18B.

The cut-off voltage was varied to 5, 50, 60, and 70 mV during the measurement of the cycle-life characteristics and the C.E., and the difference made by the variance was examined. It can be seen from FIG. 18 that the cycle-life characteristics are improved as the cut-off voltage is increased. This is because Li15Si4 is formed when the cut-off voltage is lower than 70 mV.

The negative active material of the present embodiment provides a high capacity and excellent cycle-life characteristics.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
   Si active metal grains in an amount ranging from 30 to 60 wt %; and
   a metal matrix in an amount ranging from 40 to 70 wt % comprising at least two metal elements surrounding the active metal grains and comprising a binary alloy including Cu and Al, the weight ratio of Cu:Al being 84:16 to 91:9,
   the Cu reacts with the Al to prevent the Cu from reacting with the Si and producing $Cu_3Si$ compound, and the metal matrix forms β-phase Cu—Al alloy resulting in no $Cu_3Si$ compound.

2. The negative active material of claim 1, wherein the metal matrix further comprises at least one selected from a group consisting of Mg, Mn and Ge.

3. The negative active material of claim 1, the weight ratio of Cu:Al being in the range of 87.2:12.8 to 88.8:11.1.

4. The negative active material of claim 1, the weight ratio of Cu:Al being in the range of 87.7:12.3 to 88.3:11.7.

5. The negative active material of claim 1, wherein the active metal grains and the meta matrix exist in the form of an alloy.

6. The negative active material of claim 5, wherein the alloy is expressed by the following Formula 1, $$xA\text{-}yB\text{-}zC \quad (1)$$

wherein: A and B are Si; x ranges from 0 to 60 wt %; y ranges from 0 to 60 wt %; x+y ranges from 30 to 60 wt %; z ranges from 40 to 70 wt %; and C is Cu-aAl-bM, wherein M is at least one metal selected from a group consisting of Mg, Mn and Ge, and b ranges from 0 to 20 wt %.

7. The negative active material of claim 1, wherein the active metal grains have an average grain size of 50 nm to 1000 nm.

8. The negative active material of claim 7, wherein the active metal grains have an average grain size of 50 nm to 500 nm.

9. A rechargeable lithium battery, comprising:
   a negative electrode including a negative active material, the negative active material including Si and/or Sn active metal grains in an amount ranging from 30 to 60 wt % and a metal matrix in amount ranging from 40 to 70 wt % including at least two metal elements and comprising a binary alloy including Cu and Al, the weight ratio of Cu:Al being 84:16 to 91:9, the metal matrix being configured to surround the active metal gains, the Cu reacts with the Al to prevent the Cu from reacting with the Si and producing $Cu_3Si$ compound, and the metal matrix forms β-phase Cu—Al alloy resulting in no $Cu_3Si$ compound;
   a positive electrode including a positive active material that reversibly intercalates and deintercalates lithium ions; and
   an electrolyte solution.

10. The rechargeable lithium battery of claim 9, wherein the metal matrix further comprises at least one element selected from a group consisting of Mg, Mn and Ge.

11. The rechargeable lithium battery of claim 9, wherein the positive active material comprises a lithiated intercalation compound including at least one compound selected from a group consisting of compounds represented by the following Formulae 2 to 15:

$$LiAO_2 \quad (2)$$

$$LiMn_2O_4 \quad (3)$$

$$Li_aNi_bB_cM_dO_2 \quad (4)$$

$(0.95 \le a \le 1.1, 0 \le b \le 0.9, 0 \le c \le 0.5, 0.001 \le d \le 0.1)$ $$Li_aNi_bCo_cMn_dM_eO_2 \quad (5)$$

$(0.95 \le a \le 1.1, 0 \le b \le 0.9, 0 \le c \le 0.5, 0 \le d \le 0.5, 0.001 \le e \le 0.1)$ $$Li_aAM_bO_2 \quad (6)$$

$(0.95 \le a \le 1.1, 0.001 \le b \le 0.1)$ $$Li_aMn_2M_bO_4 \quad (7)$$

$(0.95 \le a \le 1.1, 0.001 \le b \le 0.1)$ $$DX_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{3-x}F_2(PO_4)_3 \quad (14)$$

$(0 \le x \le 3)$ $$Li_{3-x}Fe_2(PO_4)_3 \quad (15)$$

$(0 \le x \le 2);$ wherein, in the Formulae (2) to (15):
A is selected from a group consisting of Co, Ni, and Mn;
B is either Co or Mn;
D is selected from a group consisting of Ti, Mo, and Mn;
E is selected from a group consisting of Cr, V, Fe, Sc, and Y;
F is selected from a group consisting of V, Cr, M, Co, Ni, and Cu;
M is at least one metal selected from a group consisting of Al, Cr, Mn, Fe, Mg, La, Ce, Sr, and V; and
X is either O or S.

12. The rechargeable lithium battery of claim 9, the weight ratio of Cn:Al being in the range of 87.7:12.3 to 88.3:11.7.

13. The rechargeable lithium battery of claim 9, wherein the active metal grains and the metal matrix comprise an alloy.

14. The rechargeable lithium battery of claim 13, wherein the alloy is expressed by the following Formula 1, $$xA\text{-}yB\text{-}zC \qquad (1)$$

where: A and B are Si; x ranges from 0 to 60 wt %; y ranges from 0 to 60 wt %; x+y ranges from 30 to 60 wt %; z ranges from 40 to 70 wt %; and C is Cu-aAl-bM, wherein M is at least one metal selected from a group consisting of Mg, Mn and Ge, and b ranges from 0 to 20 wt %.

15. The rechargeable lithium battery of claim 9, wherein the active metal grains have an average grain size ranging from 50 nm to 1000 nm.

16. The rechargeable lithium battery of claim 15, wherein the active metal grains have an average grain size from 50 nm to 500 nm.

* * * * *